Dec. 4, 1923.

H. C. TOEPPER

FASTENER

Filed May 24, 1922

1,476,380

Inventor:
Henry C. Toepper

By Miehle & Miehle,
his Att'ys.

Patented Dec. 4, 1923.

1,476,380

UNITED STATES PATENT OFFICE.

HENRY C. TOEPPER, OF DES PLAINES, ILLINOIS.

FASTENER.

Application filed May 24, 1922. Serial No. 563,230.

*To all whom it may concern:*

Be it known that I, HENRY C. TOEPPER, a citizen of the United States, residing at Des Plaines, in the county of Cook and State of Illinois, have invented a certain new and useful Improvement in Fasteners, of which the following is a full, clear, concise, and exact description, reference being had to the accompanying drawing, forming a part of this specification.

My invention has for its main object to provide a fastener which is adapted for various uses, and which is particularly adapted for use as a necktie fastener and for hanging up various articles such as a hat, the structure including a clip structure and a fastening pin device for securing the fastener to a wall or other suitable support which is movably secured with the clip structure of the fastener for movement from an operative position into a protected position whereby the fastening pin device does not interfere when the clip structure of the fastener is used alone as in fastening a necktie.

With this and other objects in view my invention consists in certain features of novelty in the construction, combination, and arrangement of parts by which the said object and certain other objects hereinafter appearing are effected, all as fully described with reference to the accompanying drawing and more particularly pointed out in the claims.

In the said drawing—

Like characters of reference indicate like parts in the several views.

Figure 1:
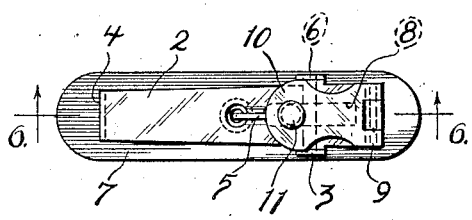
Figure 1 is a plan view of the fastening of my invention with the fastening pin device in its protected position.

In the said drawing 1 and 2 designate a pair of clamping clip members which are pivotally connected at an intermediate point in a usual manner, as shown at 3, for clamping and unclamping movement. The clamping ends of the members 1 and 2 are turned into alinement with each other, as designated at 4, as is usual to form clamp portions. A usual tensioned spring device 5 is provided to spring press the clamping clip members into clamping position and comprises a spring coiled around the pivot stud 6 of the pivotal connection of the clamping clip members and having its ends engaged with respective clamping clip members to spring press the same into clamping position thus forming a clamping clip. The front clamping clip member has an ornamental piece 7 secured on the outer surface thereof, and the rear clamping member has an intermediate opening 8 therein for purposes hereinafter described.

Figure 3:
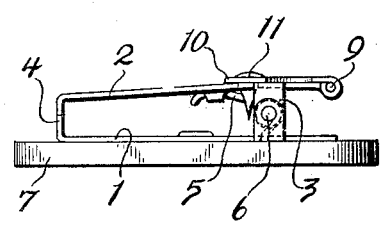
Figure 3 is a view in side elevation of the fastener as shown in Fig. 1.
Figure 5:
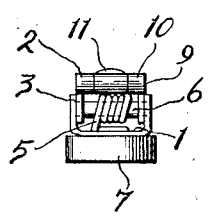
Figure 5 is an end elevation of the fastener as shown in Fig. 1.
Figure 6:
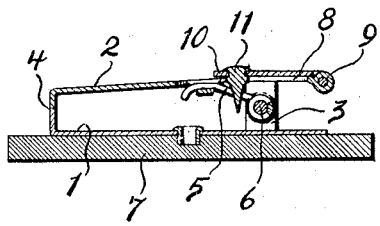
Figure 6 is a section on the line 6—6 of Fig. 1.

Pivotally secured at 9 at the non-clamping end of the rear clamping clip member on an axis parallel to the axis of the pivotal connection of the clamping members is a fastening member 10, which is adapted to be moved to and from a position overlying this clamping member, on the side opposite the other clamping member see Figs. 1, 3, and 5. A fastening pin 11 is mounted on said fastening member and arranged to project through the opening 8 when the fastening member is positioned in said position overlying the rear clamping member. In this position the fastening pin is in a position in which it is protected by the structure of the clamping members whereby the fastening pin device does not interfere when the clamping clip is used alone as in fastening a necktie.

Figure 2:
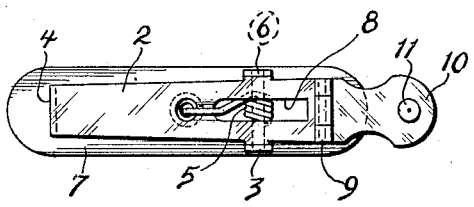
Figure 2 is a similar view with the fastening pin device in operative position.
Figure 4:
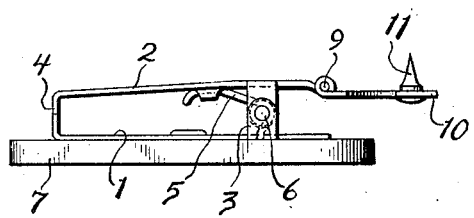
Figure 4 is a view in side elevation of the fastener as shown in Fig. 2.

When it is desired to use the fastener to hang up an article the fastening pin device is moved to the position shown in Figs. 2 and 4 in which the pin 11 may be easily driven into a wall or other suitable support and the article held in the clamping clip.

While I have herein shown and particularly described the preferred embodiment of my invention I do not wish to be limited to the precise details of construction shown as changes may readily be made without departing from the spirit of my invention, but having thus described my invention, I claim as new and desire to secure by Letters Patent the following:—

1. A fastener including a pair of clamping members pivotally connected at an intermediate point for clamping and unclamping movement and spring pressed into clamping position, one of said clamping members having an intermediately disposed opening therein, a fastening pin device pivotally secured on the last mentioned clamping member and comprising a portion adapted for movement to and from a position overlying this clamping member on the side opposite the other clamping member and a fastening pin on said portion and arranged to project through said opening when said portion is positioned to overlie the clamping member to which it is secured.

2. A fastener including a pair of clamping members pivotally connected at an intermediate point for clamping and unclamping movement and spring pressed into clamping position, one of said clamping members having an intermediately disposed opening therein, a fastening member pivotally secured to the last mentioned clamping member at its non-clamping end on an axis parallel to the axis of the pivotal connection of the clamping members and adapted to be moved to and from a position overlying this clamping member, and a fastening pin mounted on said fastening member and arranged to project through said opening when the fastening member is positioned to overlie the clamping member to which it is secured.

In witness whereof I hereunto affix my signature this twentieth day of May, 1922, A. D.

HENRY C. TOEPPER.